(12) United States Patent
Fiore et al.

(10) Patent No.: US 11,004,137 B2
(45) Date of Patent: May 11, 2021

(54) SYSTEM AND METHOD FOR TRUSTED CONTACT, BUSINESS SELECTION WITH AUTOMATED MENUING USING TRUSTED FRIENDS' AND FAMILY'S RECOMMENDATIONS

(71) Applicant: Sircles, LLC, Sacramento, CA (US)

(72) Inventors: Todd Fiore, Antelope, CA (US); John Worthington, Fair Oaks, CA (US)

(73) Assignee: SOCIAL CIRCLE, LLC, Sacramento, CA (US)

(*) Notice: Subject to any disclaimer, the term of this patent is extended or adjusted under 35 U.S.C. 154(b) by 172 days.

(21) Appl. No.: 16/009,986

(22) Filed: Jun. 15, 2018

(65) Prior Publication Data
US 2018/0365751 A1    Dec. 20, 2018

Related U.S. Application Data

(60) Provisional application No. 62/520,125, filed on Jun. 15, 2017.

(51) Int. Cl.
| | |
|---|---|
| *G06Q 30/00* | (2012.01) |
| *G06Q 30/06* | (2012.01) |
| *G06Q 50/00* | (2012.01) |
| *G06F 9/54* | (2006.01) |
| *G06F 16/951* | (2019.01) |
| *G06F 16/2457* | (2019.01) |

(52) U.S. Cl.
CPC ......... *G06Q 30/0631* (2013.01); *G06F 9/547* (2013.01); *G06F 16/24578* (2019.01); *G06F 16/951* (2019.01); *G06Q 50/01* (2013.01)

(58) Field of Classification Search
CPC ............... G06Q 30/0631; G06Q 50/01; G06F 16/24578; G06F 16/951; G06F 9/547
USPC ........................................................ 705/26.7
See application file for complete search history.

(56) References Cited

U.S. PATENT DOCUMENTS

| | | | | |
|---|---|---|---|---|
| 8,489,618 B2* | 7/2013 | L'Heureux | ........... | G06F 16/215 707/749 |
| 9,171,326 B2* | 10/2015 | Pavlidis | ................. | G06Q 50/01 |
| 2007/0143128 A1* | 6/2007 | Tokarev | ................. | G06Q 10/10 705/347 |
| 2009/0132365 A1* | 5/2009 | Gruenhagen | .......... | G06Q 30/02 705/14.69 |
| 2011/0087534 A1* | 4/2011 | Strebinger | ............. | G06Q 10/06 705/14.25 |
| 2012/0303415 A1* | 11/2012 | Edelson | ............. | G06Q 30/0282 705/7.32 |

(Continued)

OTHER PUBLICATIONS

Yu et al, Geographical Proximity Boosted Recommendation Algorithms for Real Estate, WISE 2018, pp. 51-66 (Year: 2018).*

*Primary Examiner* — Brittany N Miller
*Assistant Examiner* — Thomas Joseph Sullivan
(74) *Attorney, Agent, or Firm* — Intelink Law Group, P.C.; Jonathan Kidney

(57) ABSTRACT

A recommendation platform that provides a menu of automated recommendations from on-line information by friends, with various weighting factors, to evaluate businesses. The platform is a software deployable system that amalgamates the candidate businesses into different categories and cross-references friends' experiences with these businesses. The interface utilizes a circular-like menu and is both compact and easily navigable.

15 Claims, 10 Drawing Sheets

(56) References Cited

U.S. PATENT DOCUMENTS

| | | | | |
|---|---|---|---|---|
| 2014/0279622 A1* | 9/2014 | Lamoureux | ........ | G06Q 10/1053 |
| | | | | 705/319 |
| 2014/0324624 A1* | 10/2014 | Ward | .................... | H04W 4/021 |
| | | | | 705/26.7 |
| 2015/0278916 A1* | 10/2015 | Stoll | .................. | G06Q 30/0631 |
| | | | | 705/26.7 |
| 2016/0029098 A1* | 1/2016 | Fogelson | ............. | H04N 21/252 |
| | | | | 725/14 |

* cited by examiner

SYSTEM AND METHOD FOR TRUSTED CONTACT, BUSINESS SELECTION WITH AUTOMATED MENUING USING TRUSTED FRIENDS' AND FAMILY'S RECOMMENDATIONS

CROSS-REFERENCE TO RELATED APPLICATION(S)

This application claims the benefit of U.S. Provisional Patent Application No. 62/520,125, filed Jun. 15, 2017, the contents of which is hereby incorporated by reference in its entirety.

FIELD

This invention relates to an automated referral system based on recorded information from friends and/or family. More particularly, it is related to an interface and system for electronically obtaining trusted referrals from personally known sources for desired goods and/or services.

BACKGROUND

Seekers of services (consumers) typically use on-line resources to find a suitable provider of the desired service (e.g., plumber, auto mechanic, dog groomer, sushi place, CPA, etc.). Generally, this involves numerous hours searching, evaluating, reviewing any one or more search engine results (e.g., Google), rankings (e.g., Yelp), middlemen agencies (e.g., Angie's List), Local listings (e.g., Yahoo Local or CraigsList), and so forth. In all these instances, the consumer must review/filter a handful if not dozens of possible candidates, and it is presumed the resource is trusted. So, while the availability of "reviews" on on-line resources are plentiful, the effort needed to vet the reviews is extraordinarily tedious and there is no assurance that the candidate information is accurate. Therefore, the sheer volume of review-providing sites and reviewers renders the conventional approach unwieldy and very time consuming.

What would be desirable instead is a resource that is personally known to the seeking consumer and configured for ease of use. In fact, a well-trusted source would be friends and/or family. Understanding that social media portals have already aggregated contacts into (to some degree) friends and/or family, it would be advantageous to leverage the resources of this community for effective referral making. In view of this, the following description elucidates various systems and methods for generating referrals from trusted sources, using information from "friends and family" portal(s) or other trusted sources. Additionally, an easy interface for conveying such referrals is described.

SUMMARY

The following presents a simplified summary in order to provide a basic understanding of some aspects of the claimed subject matter. This summary is not an extensive overview, and is not intended to identify key/critical elements or to delineate the scope of the claimed subject matter. Its purpose is to present some concepts in a simplified form as a prelude to the more detailed description that is presented later.

In one aspect of the disclosed embodiments, a recommendation system for aggregating and automatically presenting to a user, a weighted list of recommendations for goods and/or services based on information obtained from media account(s) of trusted friend(s) is provided, comprising: a recommendation application running on a user's device, presenting a user interface, comprising: a first level display of general goods and/or services organized into categories and ordered in a rotatable first geometric arrangement; a second level display of types of goods and/or services organized into sets of sub-categories for each of the categories and ordered in a rotatable second geometric arrangement, wherein the sub-categories are populated with a recommended vendor of the goods and/or services from the user's friend and, if there is no friend's recommendation, populated with a non-friend recommended vendor from the recommendation system; and a third level display of the recommended vendor's contact and address information, wherein the recommended vendor in at least one of the second and third level display is weighted based on a distance of the user to the vendor and a trust level of the friend by the user; a database containing friend's recommendations for vendors, originating from an independent media account of the friend; and an application programming interface (API) communicating at least one of the user's selection of the categories and sub-categories to the database and communicating from the database at least one of the recommendation from the friend's and the recommendation system to the at least one second and third level display.

In another aspect of the disclosed embodiments, the above system is described, wherein the second level display includes a rotatable third geometric arrangement of friend's images displaced from the second geometric arrangement of sub-categories, wherein a ranking order of the friends in the third geometric arrangement is based on a weighting of trust by the user; and/or further comprising a friend-trust menu, providing a user-selectable range of trust values for a designated friend, the trust values affecting the ranking of the friend in the third geometric arrangement; and/or further comprising a maximum trust level option assignable to the designated friend; and/or wherein the media account of the friend is from a third-party; and/or wherein the system is not a stand alone social media site, relying on friend information from the third party media account; and/or wherein the friend information is obtained via an OAuth request (or proxy thereto) to the third party media account; and/or wherein the first and second geometric arrangements are at least one of circular and semi-circular; and/or further comprising a new vendor favoriting option for evaluating a new vendor by the user; and/or wherein the distance weighting (DW) for a user-to-vendor distance (D) is calculated as: DW=1.5−(D*0.01), when D is <=5; DW=1.5−(D*0.01), when D is >5 && D<=15; and DW=1 when D is >15, where the values of D are in miles or kilometers.

In another aspect of the disclosed embodiments, a method for aggregating and automatically presenting to a user, a weighted list of recommendations for businesses and/or services based on information obtained from media account(s) of trusted friend(s) is provided, comprising: displaying, on a user's smart device, in a rotatable first geometric order, a first categories of general goods and/or services; displaying, on the user's smart device, in a rotatable second geometric order, a second level of types of goods and/or services organized into sets of sub-categories for each of the first categories; populating the sub-categories with a recommended vendor of the goods and/or services from the user's friend and, if there is no friend's recommendation, with a non-friend recommended vendor from the recommendation system; and displaying, on the user's smart device, a third level of the recommended vendor's contact and address information, computing the displayed recommended vendor in at least one of the second and third level display is based on a distance from the user, weighting of the friend by the user, and weighting by the recommendation system; a database containing friend's recommendations for businesses and/or services, originating from a media account of the friend; and an application programming interface communicating a selection of the user's first categories to the database and communicating from the database at least one of a recommendation from the friend's and from the recommendation system to the at least one second and third level display, wherein the display of the second level and third level is based on a user's selection from a prior display.

In another aspect of the disclosed embodiments, the above method is described, further comprising displaying in the second level a rotatable third geometric arrangement of friend's images displaced from the second geometric arrangement of sub-categories, wherein a ranking order of the friends in the third geometric arrangement is based on a weighting of trust by the user; and/or further comprising displaying a user-selectable range of trust values for a designated friend, the trust values affecting the ranking of the friend in the third geometric arrangement; and/or wherein the media account is Facebook; and/or further comprising obtaining the friend information via an OAuth request (or proxy thereto) to the third party media account; and/or further comprising displaying a new vendor favoriting option for evaluating a new vendor by the user; and/or further comprising calculating the distance weighting (DW) for a user-to-vendor distance (D) according to: DW=1.5−(D*0.01), when D is <=5; DW=1.5−(D*0.01), when D is >5 && D<=15; and DW=1 when D is >15, where the values of D are in miles or kilometers.

In yet another aspect of the disclosed embodiments, a system for aggregating and automatically presenting to a user, a weighted list of recommendations for businesses and/or services based on information obtained from media account(s) of trusted friend(s) is provided, comprising: means for displaying, on a user's smart device, in a rotatable first geometric order, a first categories of general goods and/or services; means for displaying, on the user's smart device, in a rotatable second geometric order, a second level of types of goods and/or services organized into sets of sub-categories for each of the first categories; means for populating the sub-categories with a recommended vendor of the goods and/or services from the user's friend and, if there is no friend's recommendation, with a non-friend recommended vendor from the recommendation system; and means for displaying, on the user's smart device, a third level of the recommended vendor's contact and address information, means for computing the displayed recommended vendor in at least one of the second and third level display is based on a distance from the user, weighting of the friend by the user, and weighting by the recommendation system; a database containing friend's recommendations for businesses and/or services, originating from a media account of the friend; and an application programming interface communicating a selection of the user's first categories to the database and communicating from the database at least one of a recommendation from the friend's and from the recommendation system to the at least one second and third level display, wherein the display of the second level and third level is based on a user's selection from a prior display.

DETAILED DESCRIPTION

Figure 1:
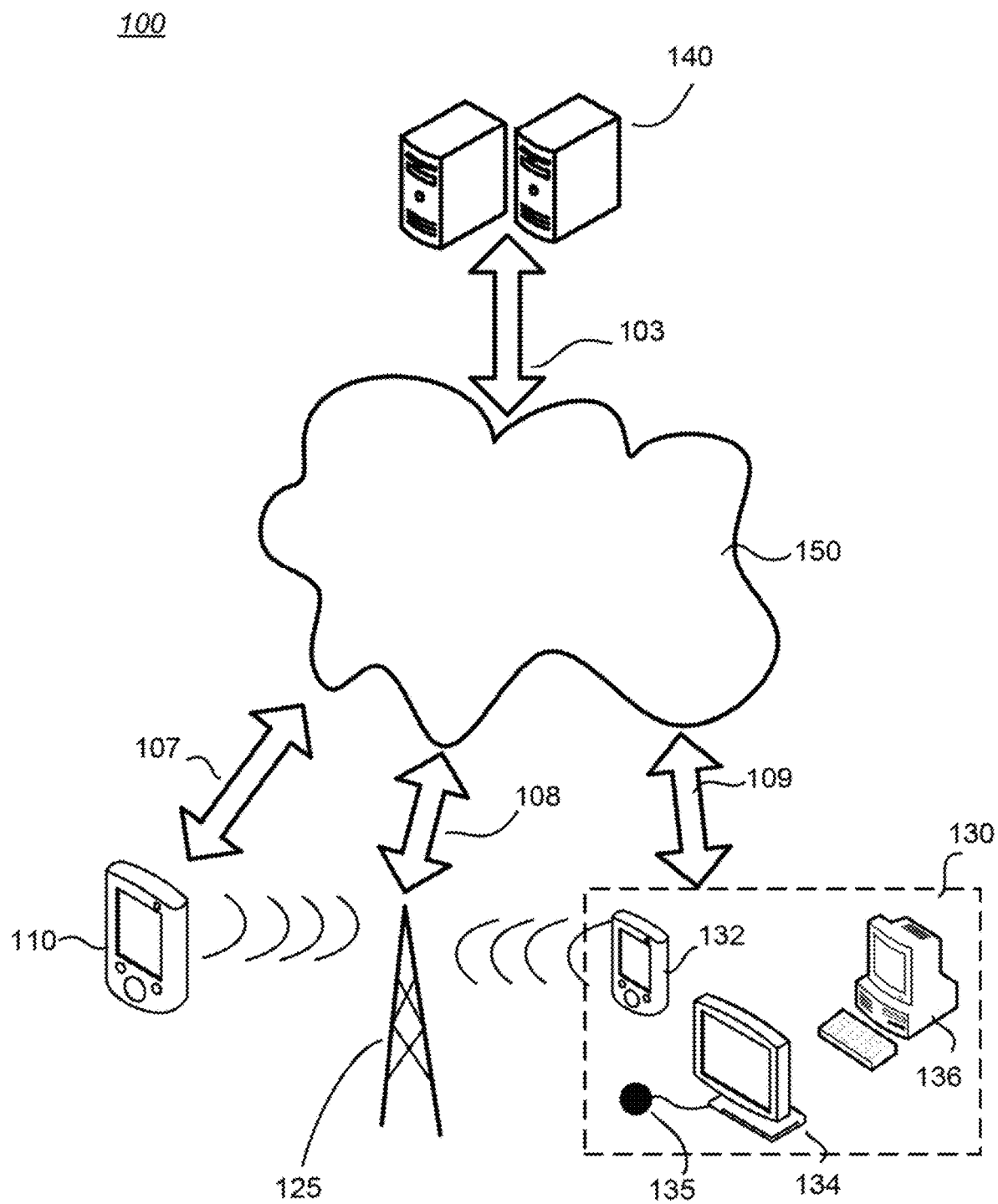
FIG. 1 is an illustration of sample hardware support system suitable for use in an exemplary embodiment.

It should be appreciated that the various embodiments described below are representative of a prototype system and/or variations of a prototype system. Therefore improvements and changes that are within the purview of one of ordinary skill may be contemplated without departing from the spirit and scope of this disclosure. That is, different implementations of the software and functionalities, including improvements thereof, may be devised according to design preference. As one non-limiting example, the various embodiments described herein utilize a user interface (described as a "Sircles App") displayed on a smart phone or smart device, as the primary user device. Of course, the software for the user interface may be easily adapted for operation on a personal computer, a terminal, or any other device that is capable of providing user input and response. Therefore, reference to the Sircles "app" in this disclosure may, depending on the context, encompass a Sircles "application(s)" or Sircles "system" containing Sircles software and supporting hardware. Also, the layout of the Sircles app on the user's smart device may be different than illustrated. For example, the main and cat circles may be reversed in positioning, or be side-by-side. Therefore, alternations to the appearance can be made without departing from the spirit and scope of this disclosure.

Also, while the back end software may be resident on a server or database, it is understood that micro-servers, personal computers or distributed databases or variations thereof may be utilized to provide the equivalent effect. For example, chain blocking technology may be utilized for managing the information. Moreover, while Facebook (registered to Facebook, Inc.) is presumed the primary source for friends and/or family recommendations, other websites or services with "review" or "recommendation" abilities may be utilized, according to design preference. Therefore, in view of the multiple ways the described embodiments can be implemented, it should be appreciated that the inventive concepts described herein are not limited to the prototype embodiments described herein.

In the prototype embodiments, the Sircles system contains a backend built upon NodeJS, a JavaScript based asynchronous open-source runtime environment. This runtime environment provides a web based Application Programming Interface (API) to retrieve, store, and provide information to the front-end interface built for mobile devices. Of course, other applicable software tools may be utilized, depending on implementation preference.

Through the Sircles system, users can sponsor businesses (or vendors of goods) as their favorited business for predefined categories (e.g. Sushi, car wash, tanning, etc.). Users can also engage with others by befriending other users. Friendships with other users will allow users to view one another's "Sircles", thereby viewing their favorites. Furthermore, by befriending other users, one will receive personalized results by taking into account the user's friendships and calculating scores using one or more determinative means. In order to use the application, users must sign in with authentication (e.g. OAuth—logging in through Facebook, LinkedIn, etc.), or by creating a local account. These and additional details are elucidated in the following figures.

It should be understood that a business or vendor may provide a service and that both entities may sell/rent goods. Therefore, the term "business" and "vendor" do not need to denote different functions and thus, depending on the context, may be interchangeable.

FIG. 1 is an illustration 100 of sample hardware support system suitable for use in an exemplary embodiment. The hardware support system can comprise one or more servers 140 connected 103 to a network cloud 150 (for example, the Internet) with secondary connection 107 (Wi-Fi or hard data line) to a customer's smart device or smart phone 110 running an exemplary embodiment via a software application/app (e.g., Sircles app). The smart device is understood to have GPS capability, though it is not a necessity, as location can be determined via alternative means. The customer's location can be delivered to the Sircles app/system (or supporting system) to provide appropriate action. The customer's smart device or smart phone 110, or can be a watch device, glasses device, virtual reality device, notebook or computer, or any computing device capable of performing software execution and interfacing with the user. Network cloud 150 can also be connected 108 to a cell phone tower or cell network 125, enabling an alternate cell-based connection between the customer's smart device 110 to the network cloud 150. Additionally, connection 109 provides communication to alternative hardware 130 and/or secondary devices. For example, secondary smart device/phone 132 can communicate to the network cloud 150 via cell network tower 125 or via connection 109. Similarly, Personal Computer (PC)/server 136 and terminal 134 with (or without) wireless router 135 can communicate to the network cloud 150 via connection 109.

It should be understood that connections 107, 108, 109 can be any form of connection that enables data transfer between the respective devices and systems and therefore should not be limited to the examples shown. Additionally, it is conceived that multiple modes of connections may be utilized (e.g., combination of cell and wi-fi, etc.).

The servers 140 are loaded with server software that supports the Sircles app that is running on the customer's device 110 and also on the secondary location's hardware 130. The Sircles app can be downloaded from the Sircles home page or from an app providing service, or via a media upload (e.g., USB drive), etc.

Figure 2:
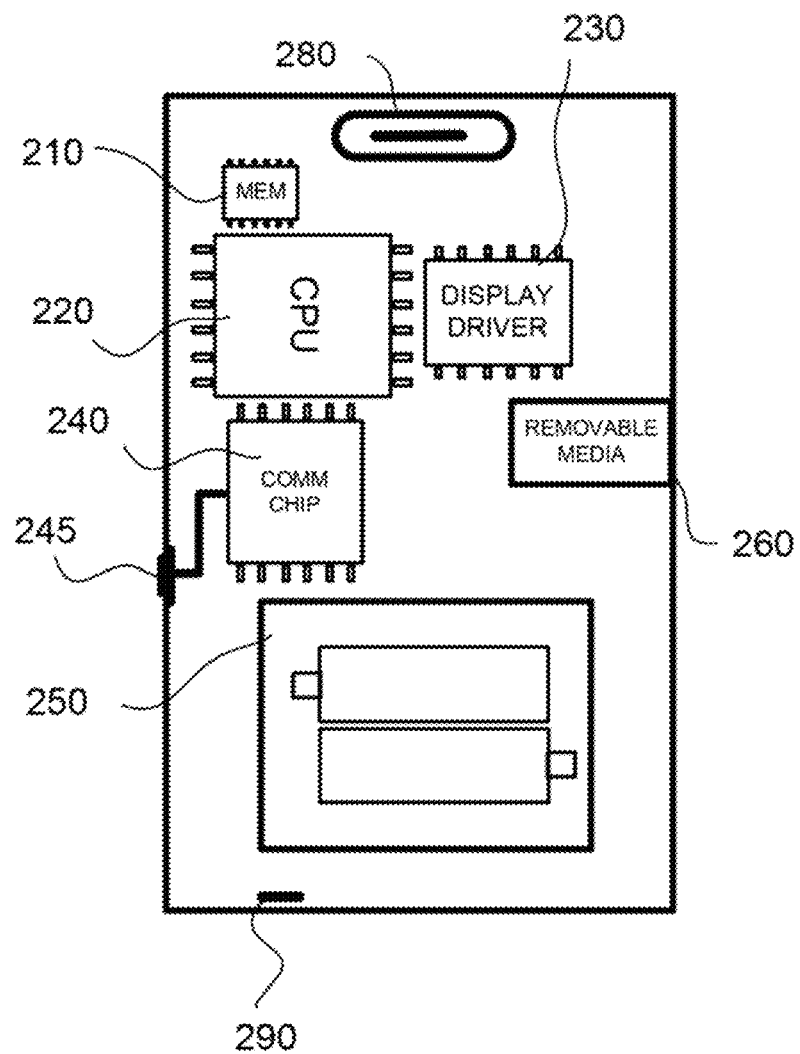
FIG. 2 is an illustration of various hardware elements typically used in mobile smart device or smart phone or mobile personal computer.

FIG. 2 is an illustration of various hardware elements typically used in mobile smart device or smart phone 200 or mobile personal computer. Depending on the sophistication of the hardware elements, the mobile smart device 200 can be made to be equivalent to computer, being miniaturized for portability. As a computing device, mobile smart device 200 will contain processor 220, memory 210, display driver 230, communications chip 240 connected to external interface 245, optional removable memory medium 260 and external interface 245 which may take the form of a IN/OUT port or an antenna for wireless transmission. Also illustrated is power source 250, speaker 280 and microphone 290, some of which may not be necessary but are shown here for completeness. The processor 220 may also contain on-chip memory (not shown). The removable memory medium 260 operates as memory storage and can take many forms, such as a USB drive, SD card, floppy disk, CD-ROM, or any conventional removable format for memory that is used in the computer industry.

It is understood that depending on the size of mobile smart device 200, memory 210 may be supplemented with additional memory such as, for example, a hard drive (not shown) either internal to mobile smart device 200 or external to mobile smart device 200. In an external scenario, the external memory (e.g., hard drive(s)) can be arranged to communicate via communications chip 240 or another interface chip.

For larger computer systems, memory will be distributed among hard drives (or an analogous form of external memory—e.g., solid state drives, optical drive, tapes, etc.), the details of which are well known and understood in the industry. In these larger systems, multiple processors 220 may be used and, as the various hardware elements are scaled for higher performance and capabilities, the form factor will also scale upward resulting in the computing device to be tantamount to a desktop computer or server. Accordingly, many of the same hardware elements described in FIG. 2 are found in desktop computers, servers, secondary devices, terminals, and so forth.

As will be appreciated by one skilled in the art, in an aspect of some embodiments of the present disclosure and of the "computer", described in FIG. 2 (and by inference to the smart device 110, servers 140, secondary hardware 130 in FIG. 1), may be embodied as an apparatus that incorporates software components. Accordingly, some embodiments of the present disclosure, or portions thereof, may combine one or more hardware components such as microprocessors, microcontrollers, or digital sequential logic, etc., such as processor 220 with one or more software components (e.g., program code, firmware, resident software, micro-code, etc.) stored in a tangible computer-readable memory device such as memory 210, removable memory media 260, CPU memory (not shown) that in combination form a specifically configured apparatus that performs the functions as described herein. These combinations, when presented as such, can form specially-programmed "modules" for achieving the functions described below.

The software component portions of the modules or functions, steps, operations that are part of Sircles process, may be written in any computer language and may be a portion of a monolithic code base, or may be developed in more discrete code portions such as is typical in object-oriented computer languages. In addition, the modules may be distributed across a plurality of computer platforms, servers, terminals, and the like. A given module may even be implemented such that the described functions are performed by separate processors and/or computing hardware platforms. In addition, some embodiments of the apparatus may include a tangible computer readable medium containing non-transitory instructions stored therein that when executed by a processing device cause the processing device to implement the methods as described herein.

Figure 3A:
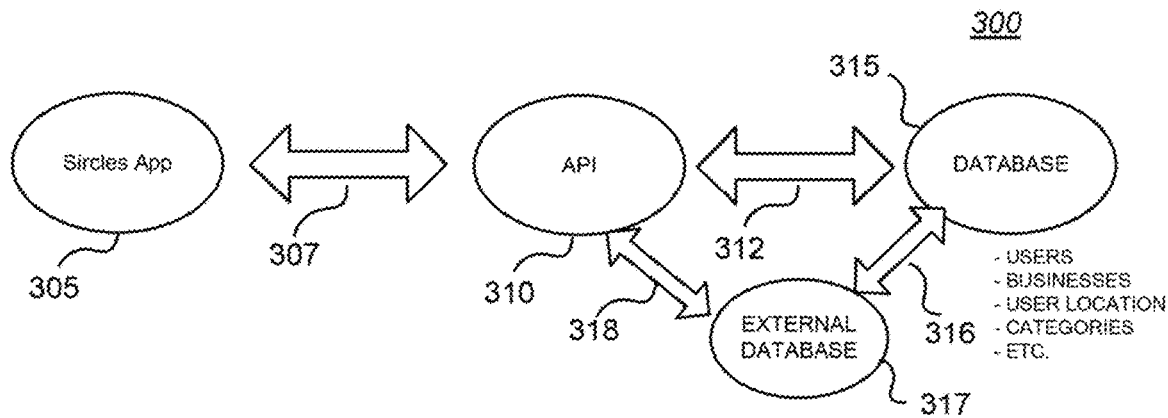
FIG. 3A is a flow block diagram 300 illustrating the basic interaction modules for Sircle's operation.

FIG. 3A is a flow block diagram 300 illustrating the basic interaction modules for Sircle's operation. Specifically, the Sircles app module 305 is connected to the Sircles database module 315 via an Applications Programming Interface (API) module 310, wherein data between the Sircles app module 305 and API module 301 and Sircles database module 315 are exchanged via communication channels 307, 312 according to any one or more of the means described in FIG. 1. The Sircles database module 315 can contain information acquired via communication channel 316 from an external database module 317, which may be independent from the Sircles system. For example, the external database module 317 may be Facebook's, LinkedIn, Google, etc. all of which are independent and separate media sites. Thus, the Sircles database module 315 may (in some embodiments) constitute an accumulation of information (e.g., users, friends, recommendations, etc.) obtained from the external database module 317, wherein the Sircles database module 315 is not an independently operated social media platform.

Moreover, the data from the external database module 317 may be polled by the API module 310 via communication channel 318 and then sent to the Sircles database module 315, bypassing communication channel 316, if so desired. Various portions of the API module 310 may be distributed on different systems and can be resident on the user's device, if so configured, or resident on the Sircles' servers. Similarly, in some embodiments, it is conceivable to have one or more portions of the Sircles' database module 315 resident or partitioned on the user's device.

As shown in FIG. 3A, Sircles database module 315 can be a repository for information pertaining to Users, Businesses, Users' Location, Categories, Vendors, Goods, etc. For efficiency in management, the primary database for user data, etc. can be contained in Sircles database module 315, which may contain a single database or an aggregation of databases (locally or remotely staged). Commensurate with each module is the understanding that supporting systems, hardware, software may be also included. As one non-limiting example, Sircles database module 315 may contain appropriate data querying (e.g. SQL), management, support, etc. systems that are independent of the underlying database. Similarly, the API and Sircles App modules 310, 305, respectively, may have operating system, data handling, communication, visualization, etc. add-ons for appropriate operation.

Figure 3B:
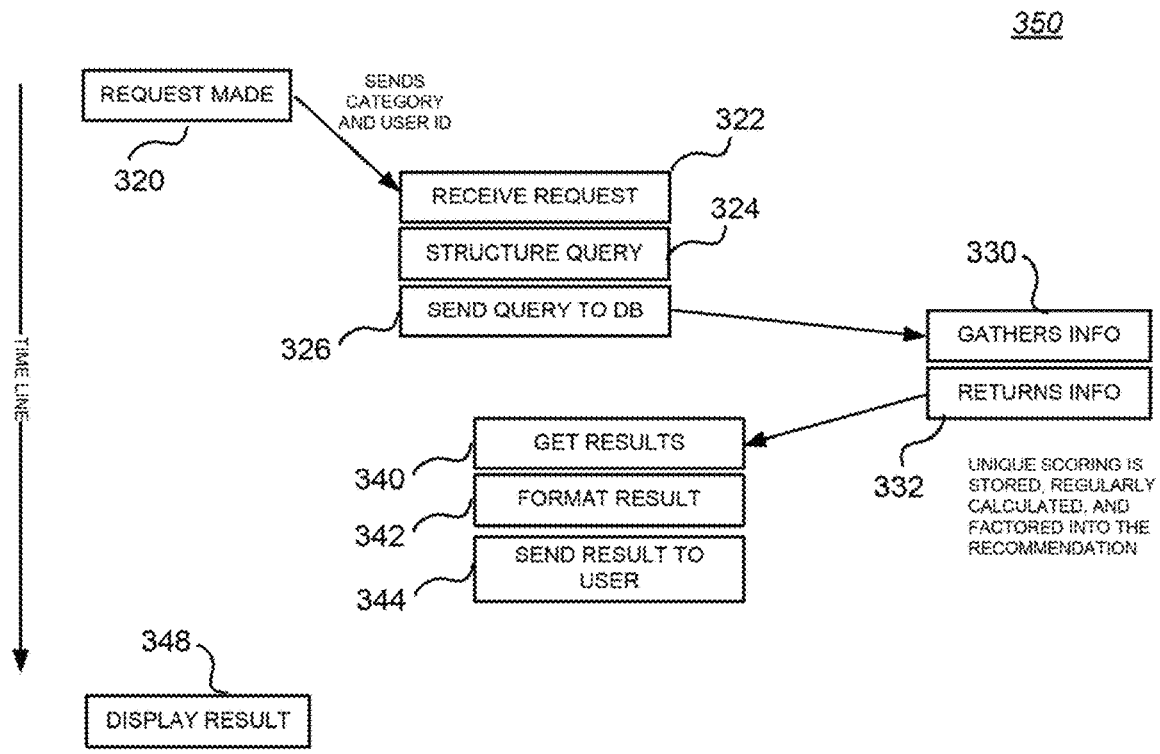
FIG. 3B is a generalization of a request-to-recommendation action path for a user's request.

FIG. 3B is a generalization of a request-to-recommendation action path 350 for a user's request. A user's recommendation request 320 is initiated by the user, which is processed by the Sircle's app (on the user's device), which sends the desired category sought and user id to the supporting API. The received request 322 is structured into a query 324, which is sent to the recipient database 326. The recipient database 326 processes the query 324 and gathers 330 the desired information (if the query is successful). Explicit in the recipient database 326 is the Sircles' scoring algorithm, which regularly is calculated and updated so as to provide as current as possible the information list and attendant recommendations.

The information is sent 332 to the requesting API and received therein 340. The information is formatted 342 by the API into a form that is suitable for transmission to the user's device. Here, additional processing, filtering, or formatting may be performed. For example, encryption/decryption, re-requests to the database (due to changed user's request, updated user location, etc.) may be instituted. Finally, the end result is send to the user 344. Upon receipt, user's device displays 348 the recommendation.

Figure 4A:
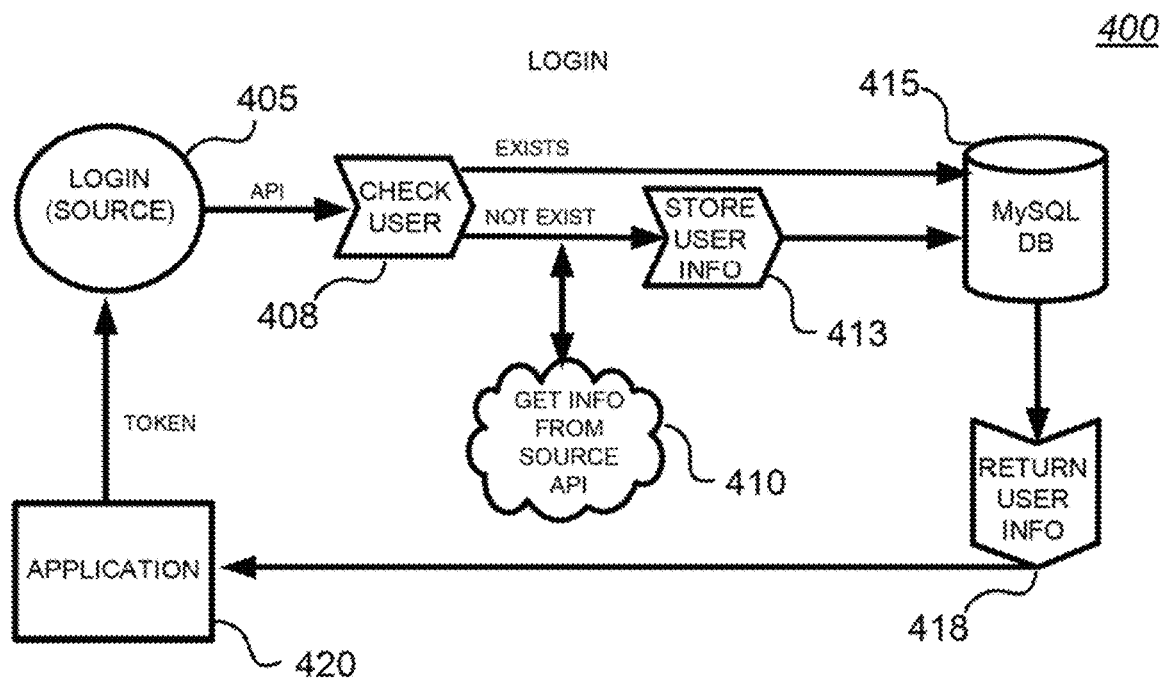
FIG. 4A is a top-level illustration of a login process.

FIG. 4A is a top-level illustration 400 of a login process. Logging into the Sircles app by a user 405 is initiated wherein the responsive API or server software checks the user 408 login information as being validated (e.g., pre-existing account name or registration of login credentials). If the user is existing or validated, the process moves onto the supporting user info database 415 (shown here as a MySQL database, but other database types may be used), containing the particulars of the registered user. If the user is a new user (e.g., not pre-existing or un-registered), then the process invokes a source API 410 that queries the user or associated reference database (e.g., Facebook, etc.) for user information so as to have an account set up, or proxy one using the reference database information. That is, "sign-in" process can be short-cutted through, for example, OAuth authentication through the third party (e.g., Facebook, etc.). Once the user info has been processed, it is stored 413 into the supporting user info database 415.

From the supporting database 415, user info (now considered part of the system) is returned to a session management application 420 that provides an access token to the login screen, enabling the user to successfully login. The token can be part of the OAuth authentication scheme or can be from the user's Sircles generated account which may use securing hashing and password salting, if so desired. In the former, expiration of the account can be updated (un-expired) by refreshing the third party data, if the user's account with the third party is still current.

Figure 4B:
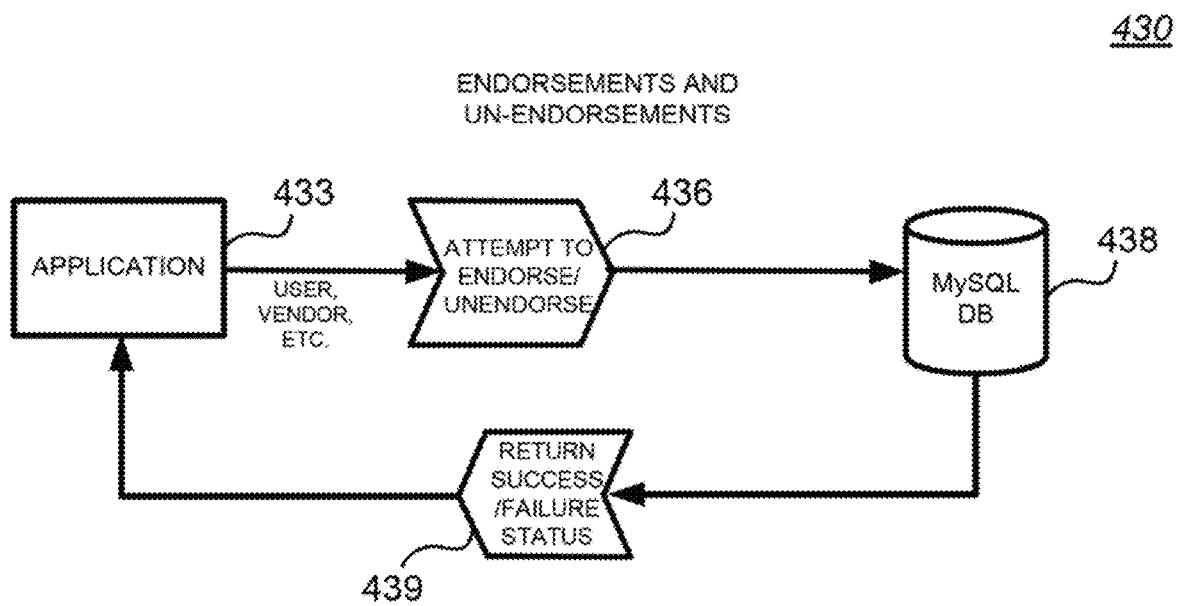
FIG. 4B is a top-level illustration of an endorsement/un-endorsement process.

FIG. 4B is a top-level illustration 430 of an endorsement/un-endorsement process. An entity (e.g., user, vendor, etc.) will invoke the Sircles application 433 and will be offered the option to endorse or, the converse, un-endorse 436 a business/vendor of goods for sale, or service, etc. that is proffered to them. The process of endorsing (aka—adding) the business can be through a search by business name, via phone contacts, from call log(s), from $3^{rd}$ party source (e.g., Facebook), geo-location of nearby businesses, or a recommendation from Sircles. The resulting choice is forwarded to a Sircles managed database 438 that contains the tally and specifics of each endorsement/un-endorsement recipient. The process provides via the Sircles application 433 a success/failure feedback 439 to the entity.

The endorsement or "favoriting" a business/vendor will affect the respective score associated will that business have with other users that are friends of the entity. Further details of the scoring are discussed below.

Figure 4C:
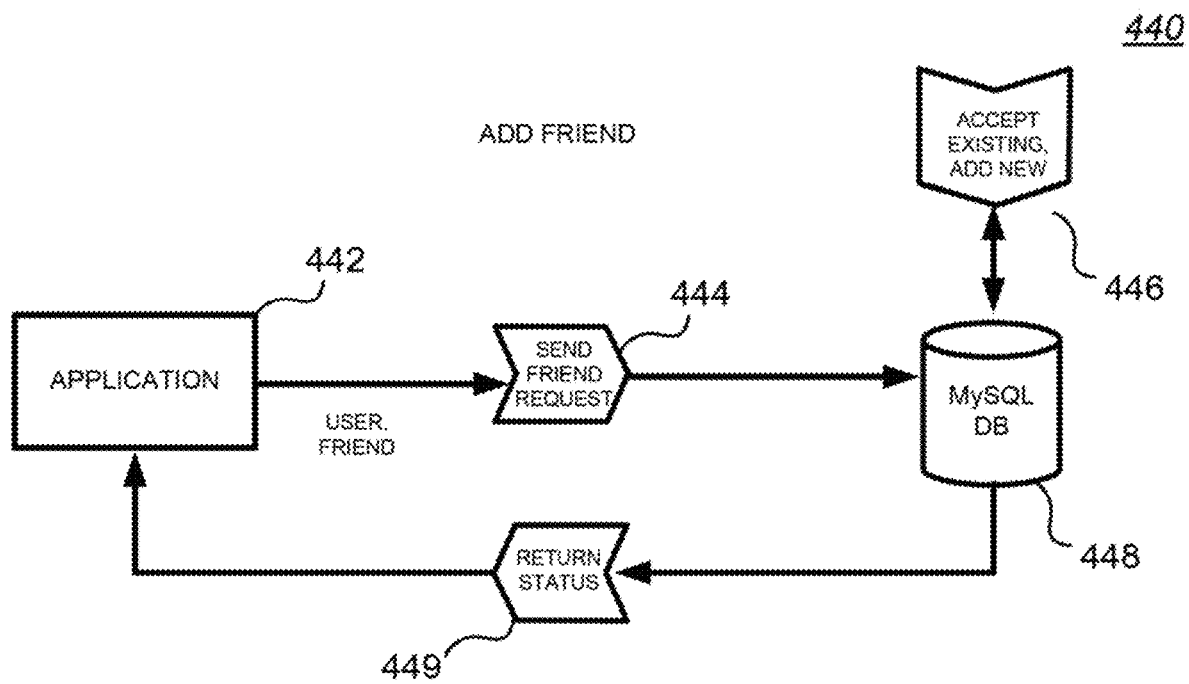
FIG. 4C is a top-level illustration of an add friend process.

FIG. 4C is a top-level illustration 440 of an add friend process. A user or entity invokes with the Sircles application 442 a friend request, which is sent 444 to a friend database 448. The friending process can be through selecting any one or more of a friend's name, menu of contacts, Share Sircles, suggestions from Sircles, and so forth. The friend request is submitted to the prospective friend who in turn accepts or rejects 446 request. That result is submitted to the friend database 448 and forwarded back 449 to the user through application 442.

It should be apparent throughout this disclosure that, depending on the choice of implementation, the term "application" and "app" may be interchangeable. For example, a smart device may be using what is commonly termed an "app" to perform the respective user interaction, while a computer may use what is commonly termed an "application." Also, some devices may use a script to perform the desired interaction, therefore, the terminology is understood to be flexible and primarily dependent on the type of device and function being performed. Further, some aspects of the functions described may be performed by the responsible API, therefore, the API may operate independently or separately (e.g., backend) from the initial user interface.

Figure 4D:
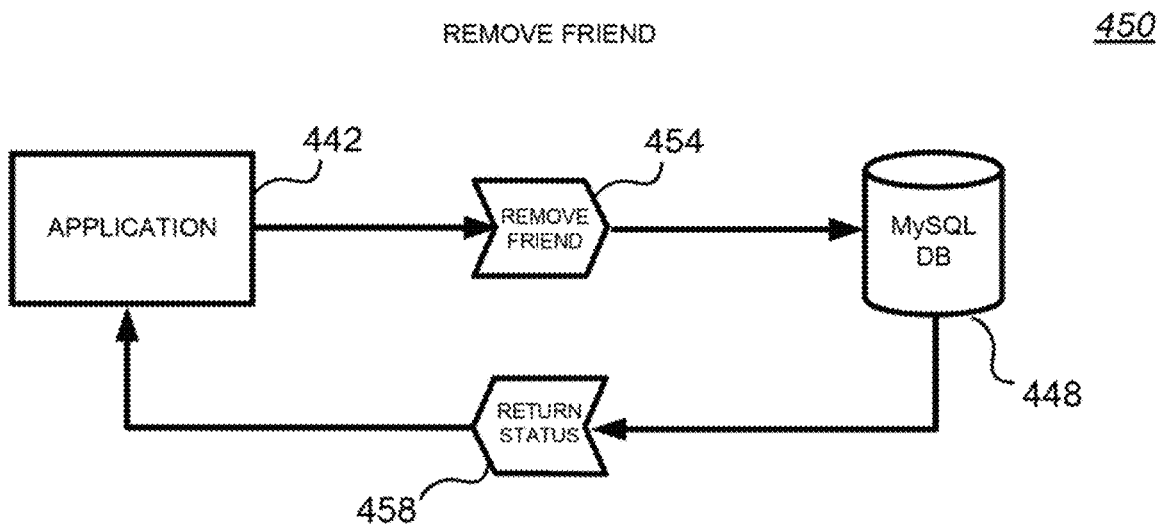
FIG. 4D is a top-level illustration of a remove friend process.

FIG. 4D is a top-level illustration 450 of a remove friend process. A user or entity invokes with the Sircles application 442 a remove friend request, which is sent 454 to the friend database 448. The de-friend result is forwarded back 458 to the user through application 442.

Figure 4E:
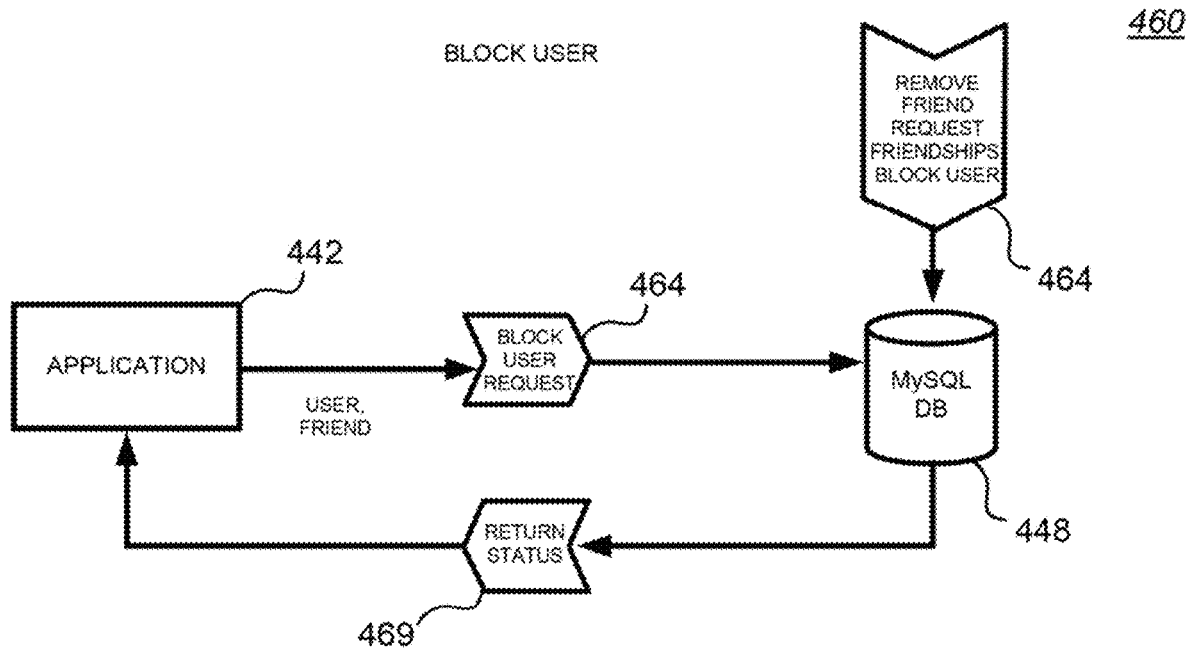
FIG. 4E is a top-level illustration of a block user process.

FIG. 4E is a top-level illustration 460 of a block user process. A user or entity invokes with the Sircles application 442 a block user request, which is sent 464 to the friend database 448. A remove user module 464 takes care of removing the designated person from the user's sphere of contacts. Essentially, this acts similarly to a telephone call-block, removing any further interaction between the blocked user. The friend database 448 is updated with the appropriate information and the result is forwarded back 469 to the user through application 442.

Figure 4F:
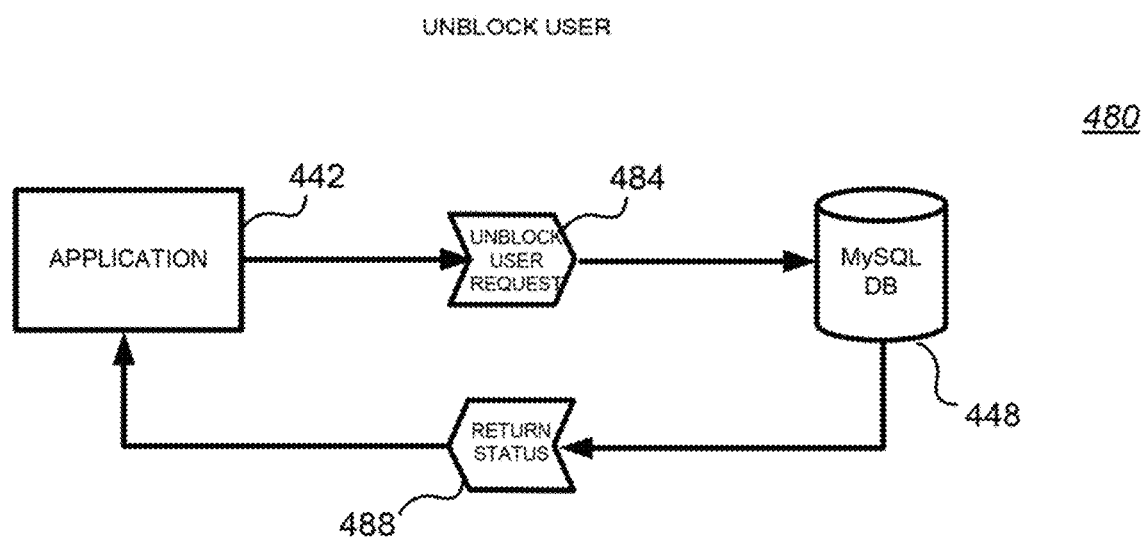
FIG. 4F is a top-level illustration of a unblock user process.

FIG. 4F is a top-level illustration 480 of a unblock user process. A user or entity invokes with the Sircles application 442 an unblock user request, which is sent 484 to the friend database 448. The friend database 448 is updated with the appropriate unblocking information and the result is forwarded back 488 to the user through application 442.

Figures 5A, 5B:
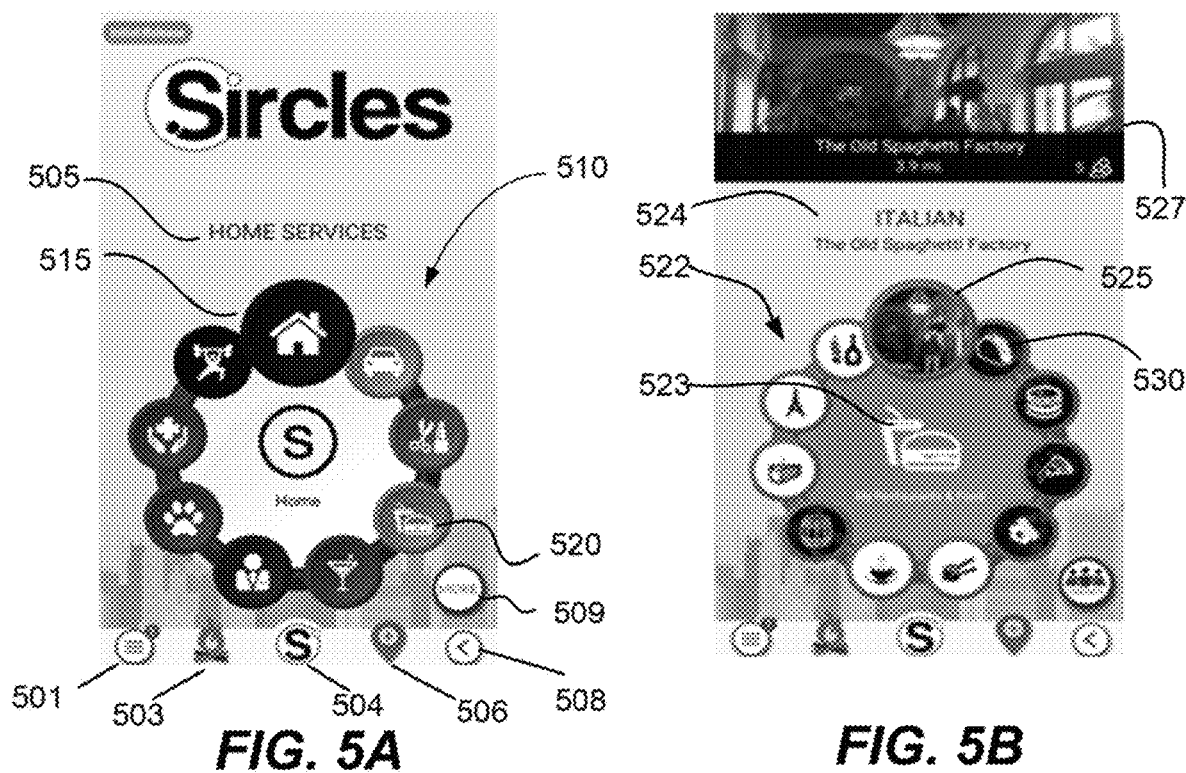
FIG. 5A is a screenshot of a home screen of a representative Sircles User Interface, displayed on a smart phone.
FIG. 5B is a screenshot of a sub-level screen of a representative Sircles User Interface, displayed on a smart phone.

FIG. 5A is a screenshot of a home screen of a representative Sircles User Interface (UI), displayed on a smart phone. The exemplary interface utilizes a rotating ring 510 of "circles," wherein each circle represents a category. The highlighted menu item 505 is the circle at the top of the ring 510 and is indicated by a larger circle 515, with smaller sibling circles. From now on, the ring 510 will be denoted as the Main Circle, and the smaller circles as Cat(egory) Circles. A user can move the Main Circle 510 by touching it, and dragging in a circular motion (e.g., clockwise or counterclockwise). The Main Circle 510 will rotate in turn, and since the Cat Circles are siblings of the Main, they will rotate as well. The rotation can occur across the z-axis of the Main Circle 510. The highlighted menu item 505 will update as each Cat Circle hits the top of the Main Circle 510. For example, in this FIG., the highlighted item is Home Services 501 corresponding to the top Cat Circle 515 (having the icon of a house).

From the home screen show above, a user may click on any of the Cat Circles. This triggers a "Toilet Bowl" like animation, which removes the currently viewed Cat Circles and creates a new set of Cat Circles. This new set of Cat Circles are categories themselves, but are considered sub-categories of the Cat Circle that was initially touched. For example, one of the Cat Circles on the home screen is Restaurants 520. If the user clicks on the Restaurant's Cat Circle 520, the animation will occur, and new Cat Circles are created which are related to Restaurants, like Sushi, Pizza, Italian Food, American Food, etc. as shown in neighboring FIG. 5B.

At the bottom of the home screen are icons for opening a menu 501, pow-wows (e.g., messaging) 503, home button 504, adding a business (or vendor) 506, back (or return to previous) 508, and customization (e.g., categories on Main Circle) 509. In some embodiments, the user interface can be customized to some degree by the user.

FIG. 5B is a screenshot of a sub-level screen of a representative Sircles User Interface (UI), displayed on a smart phone. A gallery image 527 comes in at the top of the screen at this point in the app as well. This gallery image 527 shows the suggestions that Sircles is giving to the user. There is a one-to-one relationship in the movement of this sub-level Main Circle 522 and the information shown in the gallery 527. The gallery 527 generates matches based on the techniques described in the back-end section. Text 524 at the bottom of the gallery 527 shows the vendor name of the currently selected categories suggested vendor.

Sub-level Main Circles 522 represent other categories of the prior selected menu item of Restaurants, which is also indicated by the text 523 in the center of the sub-level Main Circles 522. The sub-level Main Circles 522 may or may not have a picture within them. If they have a picture it signifies that the user has endorsed a vendor for that category. For example, if the user likes Steve's Pizza, the user can navigate to the pizza category, search for Steve's Pizza, endorse that vendor, and its picture will show within the Pizza category. Since users can endorse many vendors for one category, Sircles has been designed to pick whatever endorsements are closest to the user at that time to show.

For example, in this FIG. highlighted menu item 525 is from the user-selected Italian restaurant category and shows a picture with closest vendor information 527 and attendant distance to the vendor, at the top of the screen. Sircles illustrates this choice as being the endorsed Italian restaurant.

Figures 5C, 5D:
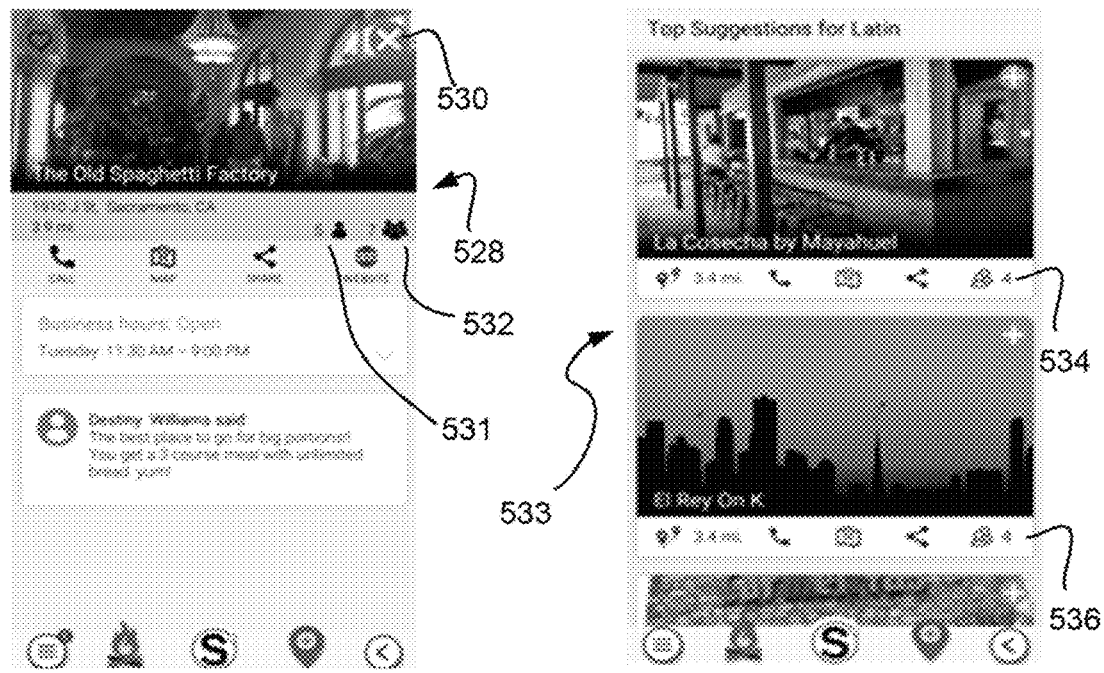
FIG. 5C is a screenshot of the user's selected vendor from FIG. 5B's menu.
FIG. 5D is a screenshot of a suggestion window provided by Sircles, corresponding to the second option.

FIG. 5C is a screenshot of the user's selected vendor (The Old Spaghetti Factory) from FIG. 5B's menu. Here, the user can navigate further into Sircles to obtain more information on the selected vendor. For example, referring to FIG. 5B, clicking on an icon in a Cat Circle on the sub-level Main Circle 522 will bring the user to one of two places. If a user has an endorsed vendor in the category that they clicked on, it will take them to a page displaying the vendor's information. An example of this scenario 528 is shown in FIG. 5C and can include the ability to call the vendor, visit the vendor's website, share the vendor with other users of Sircles, or open up the default map application on the users phone with the vendors address. The user also will have the ability to remove the vendor from the category by clicking on the associated button 530. If the user has more than one endorsed vendor for a category, the other vendors will also be listed in a scrolling view to browse and interact with. Included in this display is the number of friends that have favorited (or recommended) this business 531 and total number of Sircles users that have favorite this business 532. Additional information such as user comments can be displayed, etc.

FIG. 5D is a screenshot of a suggestion window 533 provided by Sircles, corresponding to the second option. For example, if the user does not have any endorsed vendors when clicking on the Cat Circle, they will be taken to a page where they can search for a vendor within the category. If the user clicks on the gallery, they will be brought to a list 533 of all suggested vendors for that category. Clicking on a vendor will take the user to the single vendor page, for example, as shown in FIG. 5C above. Icons 534, 536 enable the view to be switched to "friends view," as further discussed below.

Figure 5E:
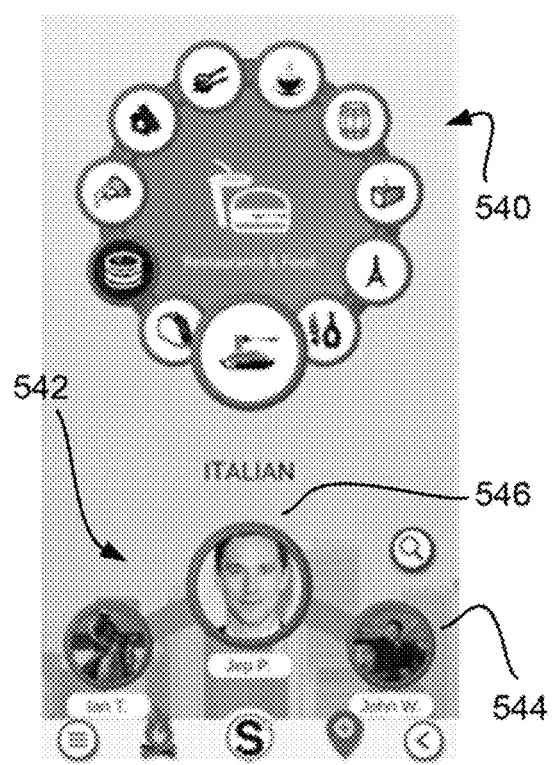
FIG. 5E is a screenshot of when a user is browsing a category with "friends view" enabled.

FIG. 5E is a screenshot of when a user is browsing a category with "friends view" enabled. By clicking on the friends button (see FIG. 5D), the sub-level Main Circle 540 moves to the top of the screen, the gallery fades off screen, and a new Friends Circle 542 comes into view at the bottom of the screen. The Friends Circle 542 follows the same or similar guidelines as the previously described Circles. The Friends Circle 542 is controlled the same way as the Main Circle except it is not bound one-to-one on movement. When a user rotates through the Friends Circle 542, they can see their friends represented by a small circle 544 with their face in it and accompanying text, with the highest ranking defaulting to the top. Original placement on the Friends Circle 542 can be based on alphabetic order or newest order, or any order desired.

Whichever friend that is currently the highest on the screen (by default of by user selection) becomes the selected friend. That selected friend 546 causes the sub-level Main Circles 540 Cat Circles to update. This update will replace any images and text with the vendors that the selected friend 546 has endorsed. The user can quickly cycle through the Friends Circle 544 to any one of their friends and have the sub-level Main Circle 540 update with that friend's endorsed vendors for that category. This provides a very rapid and convenient way to correlate visually to the user, recommendations on a per-friend basis.

It should be noted in the context of various embodiments of Sircles, friendships are relationships in which persons may befriend each other in order to view one another's favorite "Sircles" choices. This also allows influence over one another's suggested businesses/vendor of goods or services. Therefore, in order to increase or decrease the influence of a friendship, a user may specify the "Weight" of their friendship. This will impact the suggested business formula results. Users can also set specific friends as "Top Friends" and add them to their "Sircle of Trust." Users in the "Sircle of Trust" are understood to have a higher influence on the recommendations received.

Figure 5F:
FIG. 5F is a screenshot of a Sircles search result.

FIG. 5F is a screenshot of a Sircles search result. Searching within the Sircles app can be done from a variety of screens. The user enters in their search terms into the box 555 at the top of the screen. The results are fetched from the Sirles API and displayed in a list 557. Multiple tabs can be cycled through to show vendors from anywhere in the world, or locally to the user. Clicking on a vendor from a search will load the vendor UI as described above.

Figure 6A:
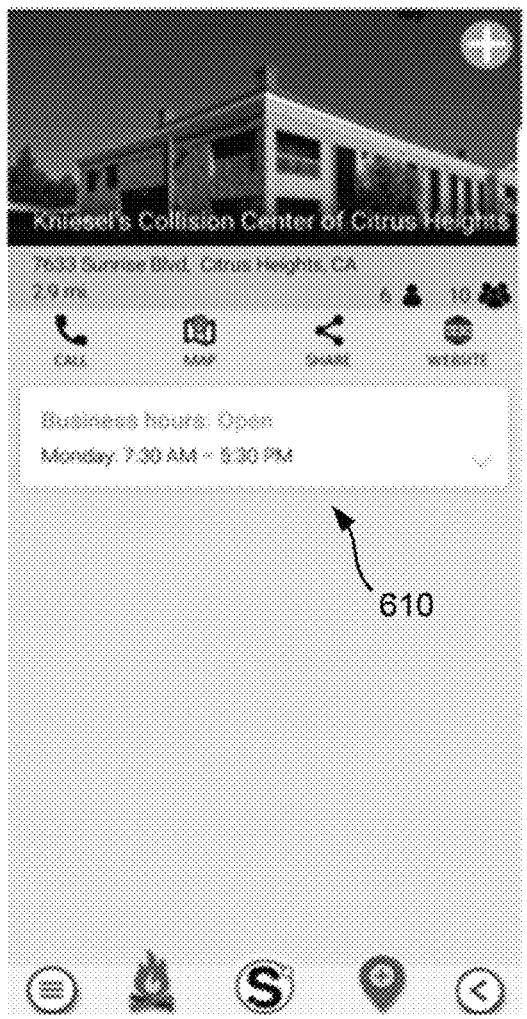
FIGS. 6A-B are a series of Sircles screen shots showing the exemplary process for "Favoriting a Business."
Figure 6B:
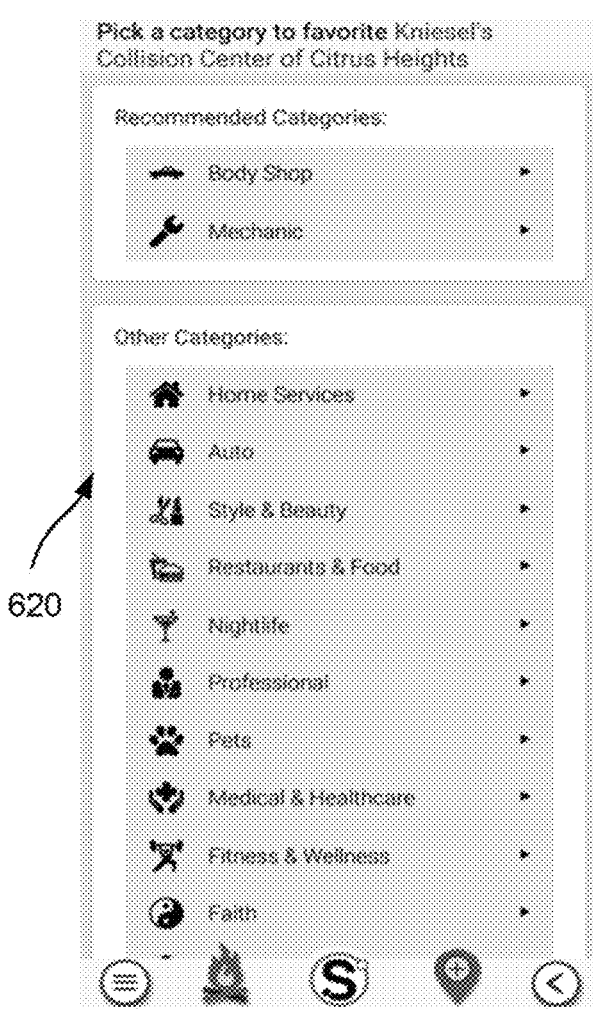

FIGS. 6A-B are a series of Sircles screen shots showing the exemplary process for "Favoriting a Business." FIG. 6A illustrates the results 610 of a search performed in Sircles. Specifically, by use of search term keywords, users can search for businesses in their area (or other) and "Favorite" them as their preferred business for a series of predefined categories (e.g. Sushi, car wash, tanning, etc.). By favoriting these businesses for these categories, these businesses will then appear on that user's Sircle when viewing it. These "Sircles" are viewable by the user and all of the user's friends. While not shown, in some embodiments, a weighting factor may be assigned to the business (for example, 3 of 4 stars, etc.) by the user. And this weighting factor can be utilized in Sircles overall recommendation engine.

For example, in FIG. 6A, the user can, by selecting the appropriate search result (either by touching the result or activating a "favorite button") transition to the image 620 shown in FIG. 6B. Here, a list of categories is provided to the user for the user to place the business into, as well as a list of recommended categories. Additional options may be available (further category menus, save-for-later, etc.), depending on design preference. For example, if a user already has a favorite but is considering using another possible favorite in the future, the user can mark this business as "saved" for possible future services. If the user decides to change a favorite, the user can quickly swap the old favorite for the new favorite. Sircles enables a user to have multiple saves as a list of saves is analogous to a wish list that can be evaluated later. It should be appreciated that the relevant business information may be obtained through various sources, including third-party APIs (including, but not limited to a business's Name, Address, location, phone number, website, photos, and hours of operation). As mentioned above, various levels of favoriting may be implemented, depending on design preference.

When users are viewing categories and there is not a pre-set business favorite by the user, Sircles can automatically provide (if available) a "Recommended" business. This business is provided on a basis of formula calculations involving distance, and businesses favorited by the user's friends for said category, respective endorsements, shares, locations, etc. Therefore, favoriting a business also will impact the influence on that business to the friend's recommended vendors. While on this subject, a user may have a single favorite for a certain business type in a specific geographical location. However, if the user likes a similar business in the same location, the user can endorse as many businesses as they'd like. This option promotes any business a user "likes" or "endorses" which also can affect a friend's matches.

Further, a user can share a business with another user (presumably a friend, but not necessarily) by using the "share" feature. This can be in the form of a message or notification within the Sircles app to the recipient, or via an external notification, for example, a text message or email. The recipient can accept or deny the recommendation or mark it as a "save for later" business for possible future re-evaluation. A share can show up in the private message box of the recipient and show up in the users activity feed. The activity feed displays current or recent activity from friends. For example:

Todd changed his plumber from Jane Doe Plumbing to Joe Blow Plumbing

Todd added Joe Blow Plumbing

Todd removed Joe Blow Plumbing

Sponsored ads

The activity feed helps to spark interaction among friends regarding the changes seen by friends. For example, "Why did you change plumbers?"

In various embodiments, an automatic scoring system or recommendation "engine" can be utilized for weighing recommendations. The engine can be part of the system's API or part of the system's database software, or any combination of the relevant systems, according to design preference. A user can have a score associated with each vendor that their friends have endorsed. Higher scores are considered better recommendations. This score is calculated for each friend's vendor, summed together to get a total score for a single vendor. A non-limiting example of a possible scoring approach is now described:

Distance Weight (DW)→where D is the distance (e.g., miles or kilometers) of vendor from the user. DW=1.5−(D*0.01), when D is <=5;

=1.5−(D*0.01), when D is >5 && D<=15;

=1 when D is >15.

Category Weight (CW)=X where X is the current weight between the two users for this category. If there is no weight associated with the friendship, then a default of CW=50 is set.

Weight (W)=X where X is the current weight between the two users. It is set=50 at default and can rise to 75 or higher if it is a "top" friend.

Total Weight (TW)→the total score of this vendor before factoring in distance, per friend. For example, TW=(W/100)^2+(CW/100)^2.

Total Score for User (TSU)→the total score this vendor has for the user, based on all Friends' TW. For example, TSU=sigma(TW) for all friends*DW.

Of course, it is understood that these values can be relative or absolute values. For example, the maximum of 100 could be changed to 500 or other values, provided the relative scaling is similar. While a linear scaling is presumed, it is understood that non-linear scaling approaches may be used.

Figure 7:
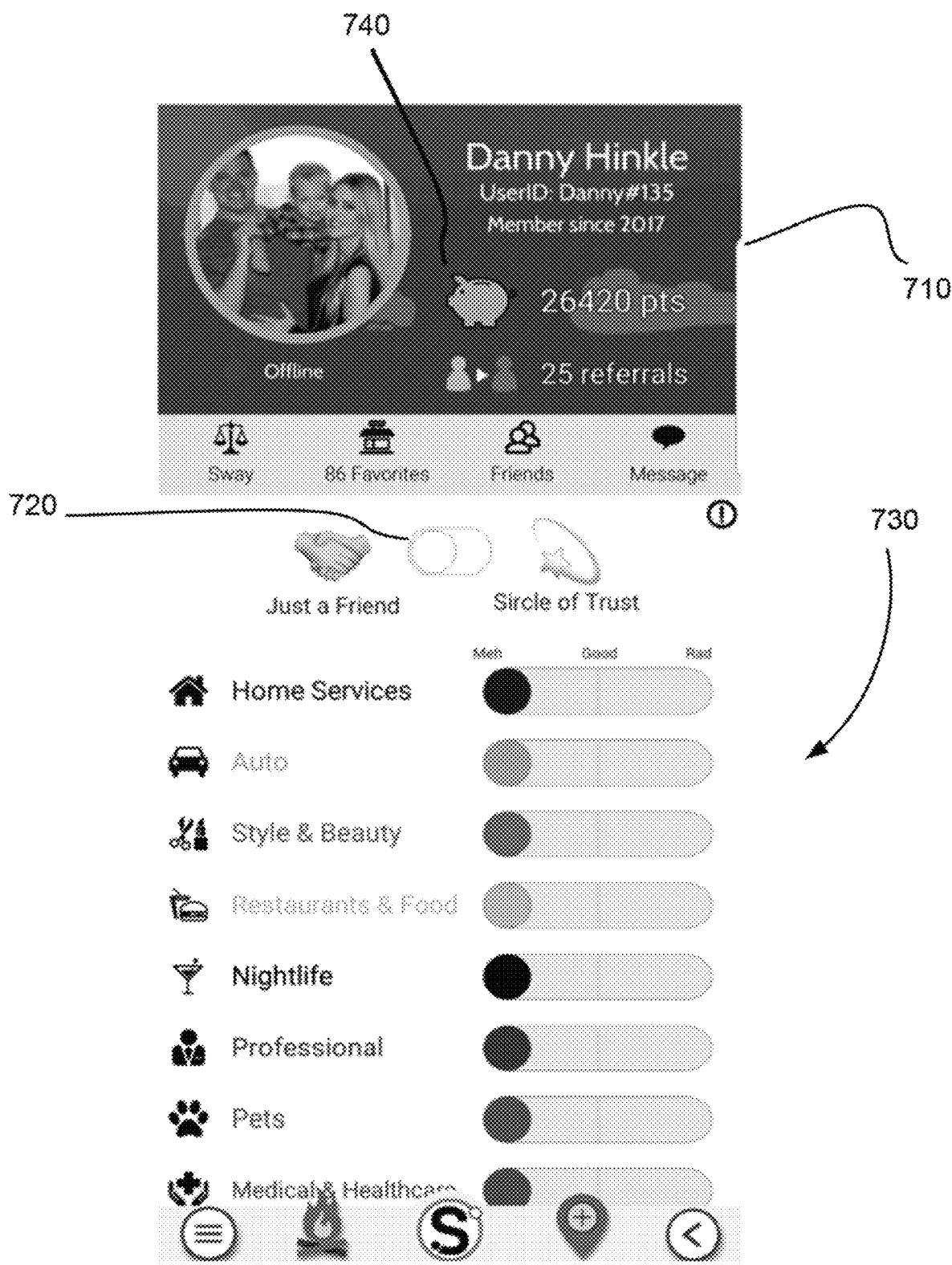
FIG. 7 is a screen shot of different control levels for determining weight by a user.

FIG. 7 is a screen shot of different control levels for determining weight (e.g., sway) by a user. In this scenario, the user can have friend Hinkle 710 added as a routine level friend or, by flicking the switch 720, have him as a highly valued friend (aka—Sircle of Trust). Sliders 730 allow the user to tailor Hinkle's recommendation levels for various businesses. In this embodiment, switch 720 gives a higher weight on all recommendations across all categories from selected friend Hinkle 710. A friend not in the circle of trust will have a so-called average weight across all categories unless sliders 730 are used to adjust the recommendation level per category. However, if a friend in the Sircle of Trust and another friend not in the Sircle of Trust show equal weighting across all categories, the switch 720 will give the friend in the Sircle of Trust a slightly higher recommendation (score/weight) than the friend not in the Sircle of Trust to result in recommendations with higher rankings in the provided list of recommendations.

It is contemplated to have an "ambassador" feature in Sircles where a user can "share" or recommend a business to another user (friend or not). This option enables users to promote or endorse businesses, hopefully to receive in turn a discount or some compensation from the businesses they patronize. A business should be enabled to see Ambassador activity and provide the kick-back/discounts accordingly. Accordingly, Pig icon 740 and associated number next to it is representative of how Hinkle ranks among other users as an ambassador of Sircles.

In various embodiments, the Sircles system can provide a private message option for users to communicate to each other, as will as integrating with $3^{rd}$ party messaging services. Since user's can sign in with Facebook, Facebook messenger can also be used to communicate. Each user's profile can identify how they can be reached when a user chooses to communicate with another user.

With respect to options for business owners, an embodiment of the Sircles system enables a user (who is an "owner" of the business) can create a profile and then "claim" this profile as his business profile and publish it as such in Sircles. The owner can then use this profile to view their relationship with clients in their community. They can see how many users have tagged them as a favorite in any given region. The owner can also see a history of total favorites which can be displayed numerically and graphically over a specified date range. This will help the owner understand if business is slowing down, staying the same, or growing.

It should be appreciated that while the context of Sircles is described in a customer-to-business environment, it is fully contemplated that business-to-business friending can be implemented in the same manner to allow businesses to evaluate other businesses. Therefore, a B2B implementation is fully within the scope of this disclosure.

Various other designs are possible, for example, the primary geometric shape of a "circle" may be oblong, triangular, rectangular, etc., and while used to represent business categories, sub-categories, and users, it may also be representative of a "group" of friends or businesses. Additionally, while the primary shape of the circle is illustrated as two-dimensional feature, it may be represented as a three-dimensional sphere (or even a polygon) taking on many different sizes and colors. Transitioning from one shape to another shape may be indicative of a different ranking (or weight) or category, if desired.

Other options that are contemplated are, for example, the ability to review details of businesses/services that have already been reviewed or frequented, such as their respective business profiles. Another example is to have a "news" feed that sees the "updated" activity of a particular business/service that has been favorited or unfavorited by friends. Another example is to view business/services that are shared by the user and by other friend, that is, to find a commonality of recommendations. This screen gives the user access to user activity regarding businesses that have been favorited or unfavorited by friends.

While the above embodiments are illustrated with screen shots of an exemplary Sircles program, it is understood that the layout shown may be altered, modified with additional or even less options, so as to provide different levels of functionalities and features to the user that are within the spirit and scope and of this disclosure.

Moreover, it should be understood that various methods or algorithm(s) described in connection with the embodiments disclosed herein may be embodied directly in hardware, in a software module executed by a processor, or in a combination of the two. Although the process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

Thus, while various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A recommendation system for aggregating and automatically presenting to a user, a weighted list of recommendations for goods and/or services based on information obtained from media account(s) of friend(s) of the user, comprising:

a recommendation application running on a user's device, presenting a user interface on a touch sensitive display of the device, the user interface comprising:

a selectable first level listing of general goods and/or services organized into categories and ordered and displayed in a rotatable first geometric arrangement, each of the categories rotating in a first path defined by the first geometric arrangement on the display in response to a user's first motion on the first level listing on the display;

a selectable second level listing of types of goods and/or services organized into sets of sub-categories for each of the categories and, when a category is selected by the user, ordered and displayed in a second geometric arrangement, each of the sub-categories rotating in a second path defined by the second geometric arrangement on the display in response to a user's second motion on the second level listing on the display, wherein the sub-categories are populated with recommended vendors of the goods and/or services from the user's friends and, if there is no friends' recommendation, populated with non-friend recommended vendors from the recommendation system; and a third level listing of contact and address information of the recommended vendors, a selected recommended vendor's contact and address information being displayed on the user device when the user selects a sub-category in the second level listing, wherein the recommended vendors in at least one of the second and third level listings is weighted based on a distance from the user to the recommended vendors and a number of times a vendor of the recommended vendors has been added as a favorite by friends of the user, wherein a distance weighting (DW) for a user-to-vendor distance (D) is calculated as:

$$DW=1.5-(D*0.01), \text{ when } D \text{ is } <=5;$$

$$DW=1.5-(D*0.01), \text{ when } D \text{ is } >5 \&\& D<=15; \text{ and}$$

$$DW=1 \text{ when } D \text{ is } >15,$$

where the values of D are in miles or kilometers;

a database containing friends' favorites for vendors, originating from an independent media account of the friends; and an application programming interface (API) communicating at least one of the user's selection of the categories and sub-categories to the database and communicating from the database at least one of friend-based recommended vendors and non-friend recommended vendors to at least one of the second and third listings.

2. The recommendation system of claim 1, wherein the second level listing includes a third geometric arrangement of friend's images displaced from the second geometric arrangement of sub-categories, wherein a ranking order of the friends in the third geometric arrangement is based on a weighting by the user.

3. The recommendation system of claim 2, further comprising a friend menu, providing a user-selectable range of weighting values for a designated friend, the weighting values affecting the ranking of the friend in the third geometric arrangement.

4. The recommendation system of claim 3, further comprising a maximum weighting level option assignable to the designated friend.

5. The recommendation system of claim 1, wherein the independent media account of the friend is from a third-party.

6. The recommendation system of claim 5, wherein the system is not a stand alone social media site, but relying on friend information from the third party independent media account.

7. The recommendation system of claim 6, wherein the friend information is obtained via an OAuth request to the third party independent media account.

8. The recommendation system of claim 1, wherein the first and second geometric arrangements are at least one of circular and semi-circular.

9. The recommendation system of claim 1, further comprising a new vendor favoriting option for evaluating a new vendor by the user.

10. A method for aggregating and automatically presenting to a user, a weighted list of recommendations for businesses and/or services based on information obtained from media account(s) of trusted friend(s), comprising:

displaying, on a touch sensitive display of a user's smart device, in a first geometric order, a first list of categories of general goods and/or services;

rotating categories of the first list in a first path defined by the first geometric arrangement, in response to a user's first motion on the display;

upon selection or a category in the first list by a user, displaying, on the user's smart device, in a second geometric order, a second list of types of goods and/or services organized into sets of sub-categories for each of the categories;

rotating the sub-categories in the second list in a second path defined by the second geometric arrangement, in response to a user's second motion on the display;

populating the sub-categories with recommended vendors of the goods and/or services from the user's friends and, if the is no friends' recommendation, with a non-friend recommended vendor from a recommendation system; and displaying, on the user's smart device, a selected vendor's contact and address information, the contact and address information being in a third listing containing contact and address information of the recommended vendors;

computing a display order of the recommended vendors in at least one of the second and third listings based on a distance from the user, weighting of the friends by the user, weighting of vendors by friends of the user, and weighting by a recommendation system, wherein a distance weighting (DW) for a user-to-vendor distance (D) is calculated as:

$$DW=1.5-(D*0.01), \text{ when } D \text{ is } <=5;$$

$$DW=1.5-(D*0.01), \text{ when } D \text{ is } >5 \&\& D<=15; \text{and}$$

$$DW=1 \text{ when } D \text{ is } >15,$$

where the values of D are in miles or kilometers;

storing via a database friends' recommendations for businesses and/or services, originating from a media account of the friends; and an application programming interface communicating a selection of the user's first categories and sub-categories to the database and communicating from the database at least one of a friend-based and a non-friend based vendors recommendations from the recommendation system to at least one of the second and third listings;

wherein the display of the second and third listings is based on a user's selection from a prior display.

11. The recommendation method of claim 10, further comprising displaying a third geometric arrangement of friend's images displaced from the second geometric arrangement of sub-categories, wherein a ranking order of the friends in the third geometric arrangement is based on a number of times a vendor of the recommended vendors has been added as a favorite by friends of the user.

12. The recommendation method of claim 11, further comprising displaying a user-selectable range of weighting values for a designated friend, the weighting values affecting the ranking of the friend in the third geometric arrangement.

13. The recommendation method of claim 10, wherein the media account is a social media account.

14. The recommendation method of claim 10, further comprising obtaining the friends' recommendation via an OAuth request to the media account.

15. The recommendation method of claim 10, further comprising displaying a new vendor favoriting option for evaluating a new vendor by the user.

* * * * *